Patented Sept. 23, 1941

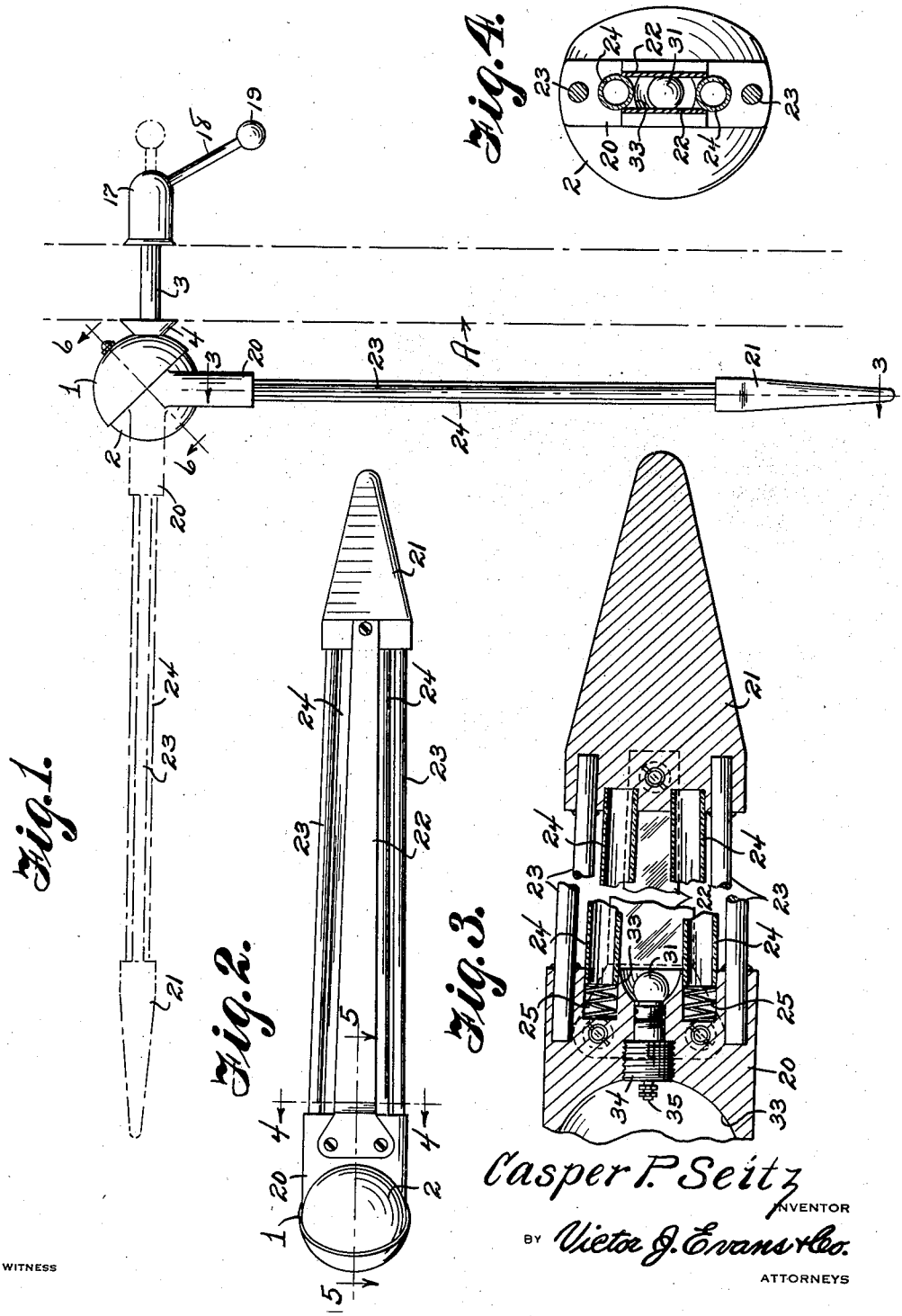

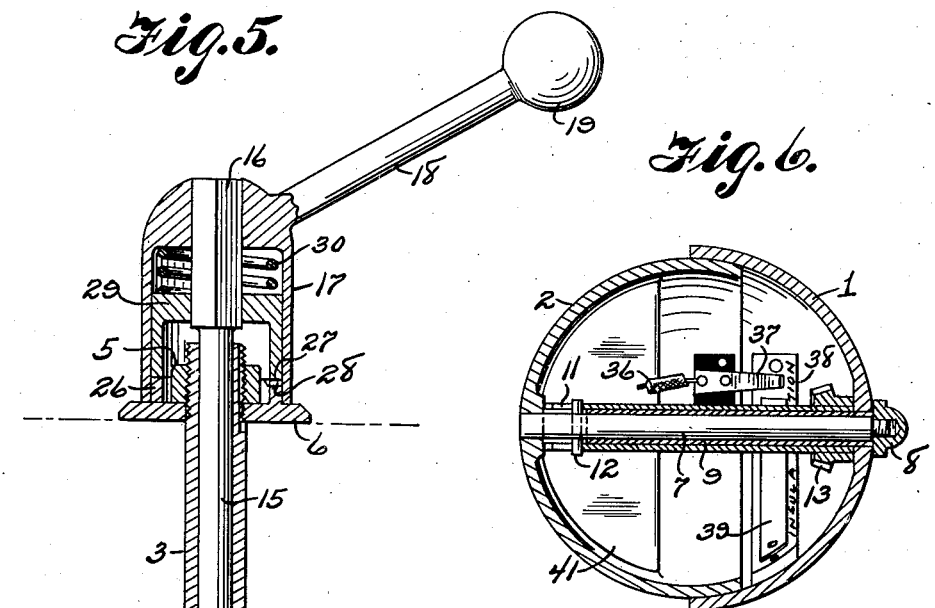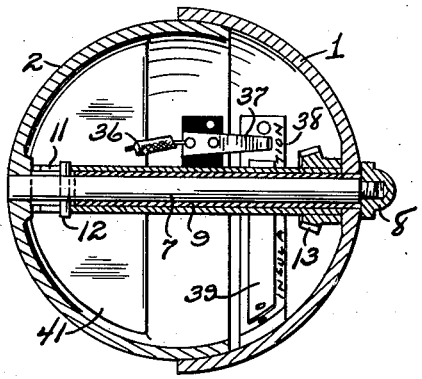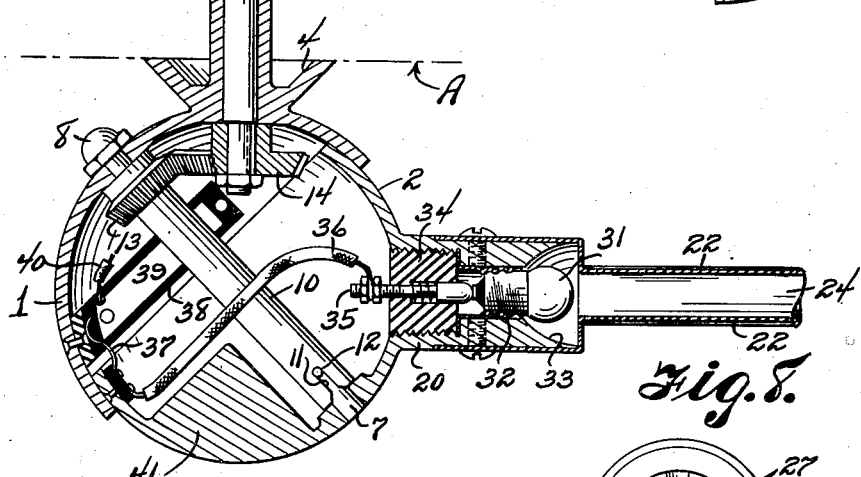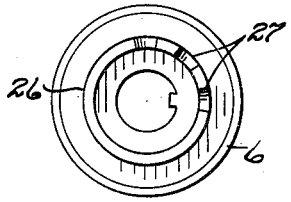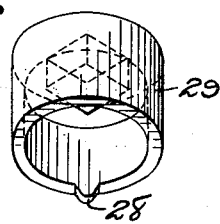

2,256,765

UNITED STATES PATENT OFFICE 2,256,765

VEHICLE SIGNALING DEVICE

Casper P. Seitz, Nampa, Idaho

Application May 27, 1940, Serial No. 337,525

2 Claims. (Cl. 116—51)

This invention relates to direction signaling devices for motor vehicles, and its general object is to provide a device that can be easily and expeditiously installed on a vehicle adjacent to the driver's seat thereof, to be conveniently operated by the driver, with minimum effort and to indicate the direction of travel of the vehicle in a clear and unmistakable manner, both during the day and at night, thus avoiding any possible confusion on the part of pedestrians and drivers of approaching vehicles, as to the intended direction that the signal equipped vehicle is going to take, in that the device includes a signal arm that is designed to be manually operated but is automatically stopped and held in several signaling positions or a normal or non-signaling position, against casual removal or displacement.

A further object is to provide a direction signaling device that includes a signal arm which is designed to attract the attention of a casual observer, as it includes parts made from glass or the like, as well as parts having maximum reflecting surfaces, thereby rendering the arm easy to see during the day, and the device likewise includes means to illuminate the arm during the night, the illuminating means being automatically operated and rendered active when the arm is in signaling positions and inactive when in normal position.

Another object is to provide a direction signaling device that includes a signal arm movable to its respective positions by a relatively short hand lever that takes up minimum space within the vehicle, yet the arm can be moved with ease, due to unique means connecting the lever to the arm and counter-balancing means for the latter.

A still further object is to provide a direction signaling device that is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a rear view illustrating my device installed on a vehicle, with a signal arm in normal position in full lines and in one of its signaling positions in dotted lines.

Figure 2 is a side view with the signal arm in normal position.

Figure 3 is a sectional view taken approximately on line 3—3 of Figure 1, looking in the direction of the arrows, with parts broken away.

Figure 4 is a sectional view taken approximately on line 4—4 of Figure 2, looking in the direction of the arrows.

Figure 5 is a sectional view taken approximately on line 5—5 of Figure 2, looking in the direction of the arrows.

Figure 6 is a sectional view taken approximately on line 6—6 of Figure 1, looking in the direction of the arrows.

Figure 7 is a perspective view of the movable member of the latching means for holding the signal arm in any of its positions.

Figure 8 is a plan view of the stationary member which cooperates with the member of Figure 7.

Referring to the drawings in detail, it will be noted that my device includes a spherical housing that is made up of a stationary substantially semi-spherical member 1 and a movable substantially semi-spherical member 2, the latter having its peripheral edge portion mounted for rotation within the peripheral edge portion of the member 1, so that the members are arranged in overlapped association with each other to provide the housing, as best shown in Figure 5.

The member 1 has formed on or otherwise secured thereto a sleeve 3 that communicates with the housing and extends eccentrically from the member 1, as well as has formed thereon and the member 1 a conical member 4 to bear against the outer face of the vehicle adjacent to the driver's seat thereof, as for example the forward portion of the front door on the driver's side, as indicated by the letter A in Figures 1 and 5. The sleeve 3 extends through the door A and has its end within the vehicle screw threaded to receive a nut 5 that bears against a washer or bearing member 6, the latter cooperating with the conical member 4 to secure my device to the vehicle, as will be obvious upon inspection of Figure 5.

The member 2 is held associated with the member 1 and for rotation therein, by a bolt 7 extending diametrically of the housing and has one end fixed to the member 2 while its opposite end extends through the member 1 and terminates in a threaded stud having mounted thereon a cap nut 8 bearing against a tube 9 fixed to the member 1 and sleeved on the bolt, as clearly shown in Figure 6. Sleeved on the tube 9 is an outer tube 10 that has diametrically opposed slots 11 extending longitudinally from one end thereof and mounted in the slots are the ends of a pin 12 that is fixed to and extends transversely through the bolt 7, so that upon rotation of the outer tube 10, the movable member 2 will be rotated, as will be apparent.

In order to rotate the movable member 2 through the medium of the outer tube 10, the pin 12, and the bolt 7, the outer tube has fixed to its opposite end, a beveled gear 13 that meshes with a beveled gear 14 of a greater diameter than the gear 13, as shown in Figure 5. The gear 14 is fixed to the end of a shaft or stem 15 that extends into the housing and through the sleeve 3, as well as terminates at its opposite end into a square cornered portion 16 having mounted thereon and secured thereto the solid portion of a substantially cylindrical skirted member 17 which has a relatively short handle 18 formed on and extending at an angle from the solid portion and terminates into a knob 19.

The signal arm of my device is of course carried by the movable member 2 and includes an inner substantially rectangular block 20 formed on the movable member to extend eccentrically therefrom, and an outer elongated block 21 that is tapered for the major portion of its length to provide a pointing head, somewhat similar to an arrow head, as will be apparent upon inspection of Figure 3. The outer block 21 is connected to the block 20 for disposal in alignment therewith, by a pair of strips 22 that have their ends secured to opposite faces of the respective blocks by screw bolts, for disposal of the strips in spaced parallel relation with respect to each other, as best shown in Figure 5. Extending between the blocks and having their end portions mounted therein is a pair of metal rods 23 arranged outwardly beyond the strips 22 and also extending between the blocks and within a cage like enclosure provided by the strips 22 and rods 23, is a pair of tubes 24 made from glass or similar material and which have their ends extending into bores within the confronting faces of the blocks, and the tubes are preferably provided with cushioning means in the form of coil springs 25 disposed between one of the ends of the tubes 24 and the bores within the inner block 20, as clearly shown in Figure 3, with the result it will be seen that the springs, strips and rods tend to protect the tubes against breakage. The housing, blocks, strips and rods are all made from or plated with some very highly polished material such as chromium or the like, so that all the exposed parts will have a reflecting surface, and that feature cooperates with the tubes 24 which may be transparent, translucent or mirrored, and of any color, to make the arm very attractive, so that it will draw the attention of a casual observer, especially when it is in its signaling positions.

It will be obvious that the arm is moved to its signaling positions or to its normal position by the handle 18, and in order to hold the arm in at least two signaling positions, and the normal full line position of Figure 1 against casual removal or displacement, I provide an annular flange 26 formed on the washer 6, the flange having three notches 27 therein for receiving a tooth 28 formed on a cup-like member 29 having a square cornered opening therein and mounted by the opening on the square cornered portion 16 of the shaft 15, as shown in Figure 5 which likewise illustrates that the skirt of the member 17 is of a diameter to fit the outer surface of the flange 26 for rotation thereon, and disposed between the cup-like member 29 and the flat inner face of the solid portion of the member 17 is a coil spring 30 that urges the tooth 28 into any one of the three notches. When the tooth is in one of the end notches, as shown in Figure 5, the signal arm will be disposed in its normal position parallel with the vehicle body or door, as shown in full lines in Figure 1. When the tooth is in the middle notch the arm will be disposed at an angle of forty-five degrees outwardly from its full line position and when the tooth is disposed in the other end notch, the arm will be arranged at a ninety degree angle as shown by dotted lines in Figure 1. Due to the use of the coil spring, it will be obvious that the tooth is automatically moved into the notches upon movement of the handle and is held therein, for holding the signal arm in its respective positions, until manually removed therefrom, thereby preventing casual movement of the arm.

The illuminating means for the signal arm includes a light bulb 31 threadedly or otherwise secured within a socket 32 disposed centrally of the inner block 20 and the block 20 is provided with a concavity 33 extending from the socket for disposal about the bulb, as best shown in Figure 5. The concavity is provided with a reflecting surface, to direct the light rays from the bulb to the strips 22, rods 23 and tubes 24, which in turn reflects the light rays to the outer block or head 21, with the result it will be seen that the light bulb 31 can be of minimum candle power, yet the signal arm will be illuminated substantially in its entirety.

The inner block is provided with a threaded bore opening into the housing and which has threaded therein a plug 34 of insulating material carrying a spring pressed contact member 35 held in engagement with the central contact member of the bulb while the sleeve or threaded contact member of the bulb is grounded through the socket and block, as will be apparent. The contact member 35 has secured thereto, by binding nuts, one end of a conductor 36 that has its opposite end connected to a spring arm 37 that is fixed to and insulated from the movable member 2. The spring arm 37 provides a movable element for a switch which includes a stationary element made up of a strip 38 of insulating material having secured thereto a strip 39 of conducting material and the strips 38 and 39 are secured to the stationary member 1 for disposal in the path of the spring arm 37. The strip 39 has electrically connected thereto one end of a conductor 40 while its opposite end is in circuit with a suitable source of current, such as the battery of the vehicle. By that construction, it will be obvious that when the signal arm is in its normal position, the spring arm 37 will be engaged with the strip of insulating material 38, but when the signal arm is moved slightly from its normal position, the spring arm 37 will engage the strip 39 of conducting material and thereby close the circuit to the lamp bulb, so that it will be seen that the signal arm is illuminated in any position, other than its normal position, and during the movement thereof to and from its normal position.

In order to facilitate movement of the signal arm, I provide a weight 41 formed on and within the movable member 2 and is disposed to counter-balance the weight of the arm.

The operation of my device will be obvious from the above description and the disclosure in the drawings. It will be further obvious that by providing a short handle 18, that it will take up minimum space within the vehicle and that the knob 19 provides a convenient gripping means for the driver. While the handle is short, the signal arm can be readily moved thereby, due to the counter-balancing weight and the ratio or difference in size of the gears 13 and 14, and it will be understood that the gear ratio can be varied from that shown to meet existing conditions.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A direction signaling device for a vehicle, comprising a signal arm, means for attaching the arm to one side of the vehicle and including a sleeve for disposal through said side, a bearing member mounted on the sleeve, a nut threaded on the sleeve for securing the bearing member against the vehicle, a shaft extending through the sleeve for rotation therein and having a square cornered end portion for disposal in the vehicle, means on the opposite end of the shaft cooperating with the signal arm for movement of the latter to a normal depending position parallel to the side of the vehicle and to signaling positions at lateral angles to said side, an annular flange formed on the bearing member and having spaced notches therein, a skirted member secured to said square cornered portion and mounted for rotation on the flange, a handle secured to the skirted member, a cup like member mounted within the skirted member and carried by said square cornered portion for slidable movement thereon, a tooth on the cup like member and receivable in any of the notches for automatically stopping the arm in either of its positions and holding the same accordingly against casual movement, and a spring between the cup like member and the skirted member for urging and holding the tooth in the notches.

2. A direction signaling device for a vehicle comprising a housing including a substantially semi-spherical stationary member and a substantially semi-spherical movable member having the edge portions disposed in overlapped engagement, means for fixing the stationary member to one side of the vehicle and including a sleeve formed on the stationary member and extending eccentrically therefrom for disposal through said side, means threaded on the sleeve for securing the latter to the vehicle, a bolt traversing the housing and having one end fixed to the movable member and its opposite end connected to and mounted for rotation on the stationary member, an inner tube sleeved on the bolt to provide a bearing therefor and fixed to the stationary member, an outer tube sleeved on the inner tube and having diametrically opposed slots extending longitudinally thereof from one end, a pin fixed to the bolt and extending into the slots for rotating the movable member upon rotation of the outer tube, a signal arm carried by the movable member, a shaft extending through the sleeve for disposal of one end thereof in the housing and its opposite end in the vehicle, handled means fixed to the latter end of the shaft, a relatively large gear fixed to the end of the shaft within the housing, and a relatively small gear fixed to said outer tube and meshing with the first gear for rotating the outer tube upon movement of the handled means to move the signal arm to a normal depending position parallel with the side of the vehicle and to signaling positions at lateral angles to said side.

CASPER P. SEITZ.